(12) United States Patent
Vandermeijden et al.

(10) Patent No.: US 8,321,572 B2
(45) Date of Patent: *Nov. 27, 2012

(54) METHOD AND APPARATUS FOR ENHANCING DISCOVERABILITY AND USABILITY OF DATA NETWORK CAPABILITY OF A MOBILE DEVICE

(75) Inventors: Tom R. Vandermeijden, Pacifica, CA (US); James P. La Fleur, Mill Valley, CA (US)

(73) Assignee: Unwired Planet, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,581

(22) Filed: Sep. 19, 2011

(65) Prior Publication Data

US 2012/0009911 A1    Jan. 12, 2012

Related U.S. Application Data

(63) Continuation of application No. 12/702,105, filed on Feb. 8, 2010, now Pat. No. 8,046,433, which is a continuation of application No. 10/336,398, filed on Jan. 3, 2003, now Pat. No. 7,660,870.

(51) Int. Cl.
*G06F 15/16* (2006.01)
(52) U.S. Cl. ..... 709/227; 709/228; 709/217; 379/88.18; 379/88.2; 455/412.2; 455/466
(58) Field of Classification Search ................ 709/217, 709/227, 203; 379/88.18; 455/421.2, 466
See application file for complete search history.

(56) References Cited

U.S. PATENT DOCUMENTS

| 5,784,001 | A | 7/1998 | Deluca et al. |
| 5,794,142 | A | 8/1998 | Vanttila et al. |
| 5,941,946 | A | 8/1999 | Baldwin et al. |
| 6,038,295 | A | 3/2000 | Mattes |
| 6,133,985 | A | 10/2000 | Garfinkle et al. |
| 6,243,443 | B1 | 6/2001 | Low et al. |

(Continued)

FOREIGN PATENT DOCUMENTS

EP    0993165 A2    4/2000
(Continued)

OTHER PUBLICATIONS

Press Release: "FunMail officially Launches its MMS Service on NTT DoCoMo's i-mode", Tokyo, Japan, May 21, 2002, 2 pgs.

(Continued)

*Primary Examiner* — Abdullahi Salad
(74) *Attorney, Agent, or Firm* — Morgan, Lewis & Bockius LLP

(57) ABSTRACT

In a technique for enhancing discoverability and increasing usage of a web browser in a mobile device on a wireless network, a server system coupled to the wireless network receives a signal representing initiation of a voice call from the mobile device. In response, the server system performs a lookup to determine whether a website is associated with the telephone number being called. If a website is associated with the telephone number being called and the mobile device has the capability to access and display the website, the server system sends an Alert to the mobile device, causing the mobile device to notify its user about the website. The user may then input a selection to either access the website instead of completing the call or to proceed with the voice call.

33 Claims, 7 Drawing Sheets

U.S. PATENT DOCUMENTS

| | | |
|---|---|---|
| 6,456,854 B1 | 9/2002 | Chern et al. |
| 6,487,602 B1 | 11/2002 | Thakker |
| 6,612,488 B2 | 9/2003 | Suzuki |
| 6,708,214 B1 | 3/2004 | La Fleur |
| 6,728,530 B1 | 4/2004 | Heinonen et al. |
| 6,795,711 B1 | 9/2004 | Sivula |
| 6,832,102 B2 | 12/2004 | I'Anson |
| 6,842,612 B2 | 1/2005 | Kalish et al. |
| 6,865,608 B2 | 3/2005 | Hunter |
| 2001/0034225 A1 | 10/2001 | Gupte et al. |
| 2001/0037381 A1 | 11/2001 | Vau |
| 2001/0056473 A1 | 12/2001 | Arneson et al. |
| 2002/0016174 A1 | 2/2002 | Gibson et al. |
| 2002/0026289 A1 | 2/2002 | Kuzunuki et al. |
| 2002/0042277 A1 | 4/2002 | Smith |
| 2002/0052912 A1 | 5/2002 | Griswold et al. |
| 2002/0055350 A1 | 5/2002 | Gupte et al. |
| 2002/0057678 A1 | 5/2002 | Jiang et al. |
| 2002/0115446 A1 | 8/2002 | Boss et al. |
| 2002/0126708 A1 | 9/2002 | Skog et al. |
| 2003/0003935 A1 | 1/2003 | Vesikivi et al. |
| 2003/0053608 A1 | 3/2003 | Ohmae et al. |
| 2003/0078058 A1 | 4/2003 | Vatanen et al. |
| 2003/0097410 A1 | 5/2003 | Atkins et al. |
| 2003/0099335 A1* | 5/2003 | Tanaka et al. ............ 379/88.16 |
| 2003/0103608 A1* | 6/2003 | Pearson et al. ............ 379/88.18 |
| 2003/0135463 A1 | 7/2003 | Brown et al. |
| 2003/0135569 A1 | 7/2003 | Khakoo et al. |
| 2003/0145037 A1 | 7/2003 | Von Garssen |
| 2003/0172121 A1 | 9/2003 | Evans et al. |
| 2003/0200268 A1 | 10/2003 | Morris |
| 2003/0211856 A1 | 11/2003 | Zilliacus |
| 2003/0212601 A1 | 11/2003 | Silva et al. |
| 2004/0024846 A1 | 2/2004 | Randall et al. |
| 2004/0066419 A1 | 4/2004 | Pyhalammi |
| 2004/0075675 A1 | 4/2004 | Raivisto et al. |
| 2004/0083114 A1 | 4/2004 | Yue |
| 2004/0087300 A1 | 5/2004 | Lewis |
| 2004/0092250 A1 | 5/2004 | Valloppillil |
| 2004/0092272 A1 | 5/2004 | Valloppillil |
| 2004/0092273 A1 | 5/2004 | Valloppillil |
| 2004/0117255 A1 | 6/2004 | Nemirofsky et al. |
| 2004/0203970 A1 | 10/2004 | Rooke et al. |
| 2005/0125723 A1* | 6/2005 | Griswold et al. ............ 715/513 |
| 2005/0162518 A1 | 7/2005 | Furon et al. |
| 2005/0193078 A1 | 9/2005 | Jordan, Jr. |

FOREIGN PATENT DOCUMENTS

| | | |
|---|---|---|
| EP | 1148754 A2 | 10/2001 |
| EP | 1187425 A2 | 3/2002 |
| EP | 1233599 A2 | 8/2002 |
| JP | 2000-250854 | 9/2000 |
| JP | 2002-101369 | 4/2002 |
| WO | WO 01/90937 A2 | 11/2001 |
| WO | WO 02/089448 A2 | 11/2002 |

OTHER PUBLICATIONS

Harry Newton, Newton's Telecom Dictionary, "E Wear / Earth Station", 4 pgs, 2004.

* cited by examiner

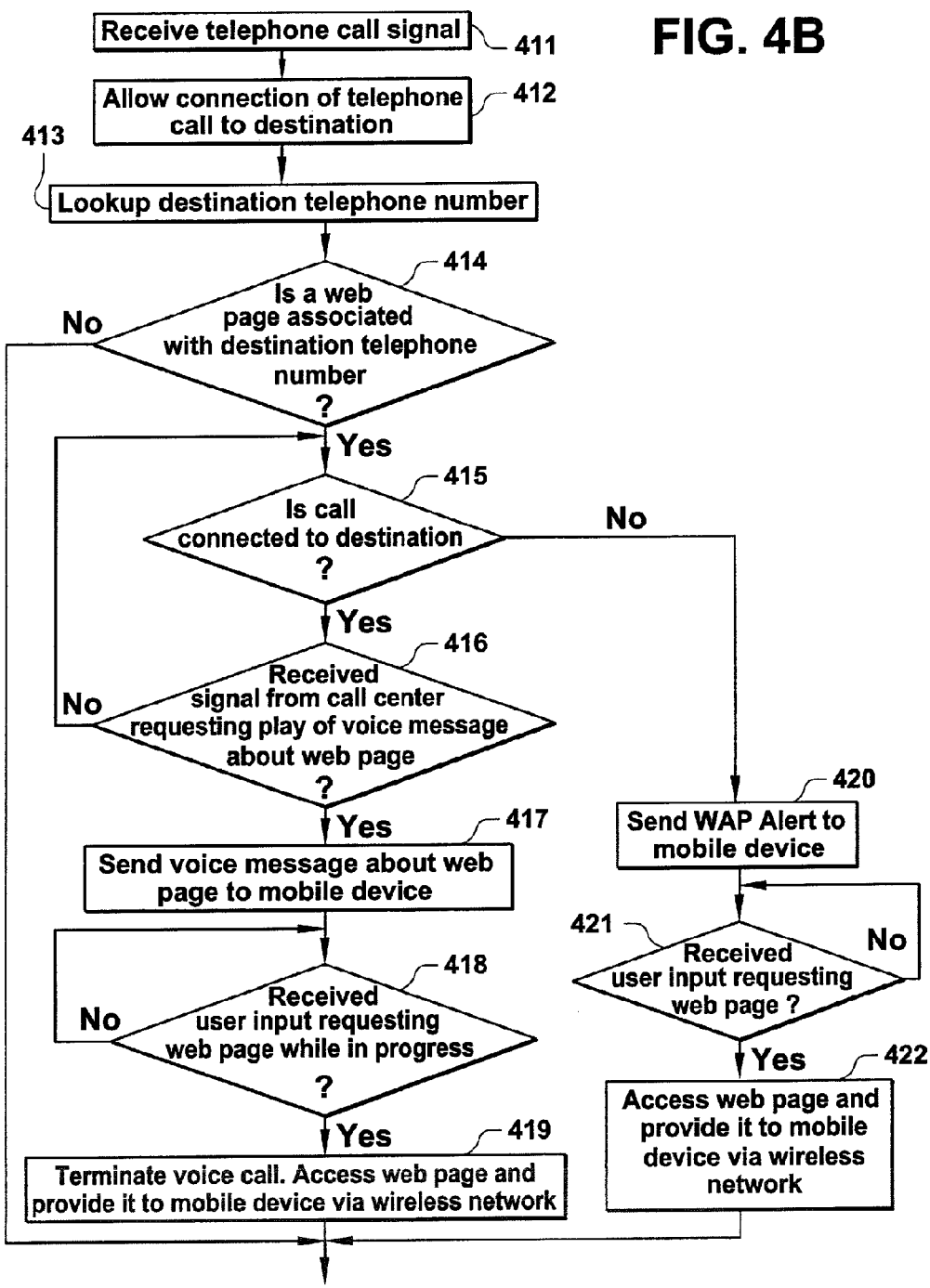

METHOD AND APPARATUS FOR ENHANCING DISCOVERABILITY AND USABILITY OF DATA NETWORK CAPABILITY OF A MOBILE DEVICE

RELATION APPLICATIONS

This application is a continuation of U.S. application Ser. No. 12/702,105 filed Feb. 8, 2010, now U.S. Pat. No. 8,046, 433 which is a continuation of U.S. application Ser. No. 10/336,398 filed Jan. 3, 2003 (U.S. Pat. No. 7,660,870), the disclosures of which are hereby incorporated herein by reference in their entireties for all purposes.

FIELD OF THE INVENTION

At least one embodiment of the present invention pertains to mobile devices that operate on wireless telecommunications networks and, more particularly, to enhancing discoverability and increasing usage of web browsers in such devices.

BACKGROUND

Personal mobile communication/computing devices, such as cellular telephones, personal digital assistants (PDAs) and two-way pagers, have become ubiquitous in most modern countries. These devices can be collectively referred to as "mobile devices". Many of the latest generation of mobile devices provide their users with the ability to access resources on the Internet via wireless telecommunications networks (or simply, "wireless networks"). For example, some of these mobile devices allow their users to access World Wide Web pages, exchange email and download files over the Internet. Devices which can access the World Wide Web include a software application called a browser, which when implemented in a small (e.g., handheld) mobile device is sometimes more precisely referred to as a "minibrowser" or "microbrowser". With the introduction of so-called "2.5G" and "3G" mobile devices, mobile devices will have a much broader range of capabilities than ever before.

Yet many users of mobile devices never or rarely use the most powerful data-centric capabilities of these devices, particularly the browser. One of the main reasons for this is that many users are not technologically sophisticated and, thus, are not aware of the full capabilities of their devices. Other users are aware of the browser but do not know how to use it. Users of cellular telephones in particular may be aware of the browser but rarely think to use it, because they think of the cellular telephone as primarily a voice communication device and not a data-centric device. It does not occur to many users that often web content that is relevant to their current situation is easily accessible to them simply by using the browsers of their mobile devices. Still other users are aware of the browser and may even know how to access the Web, but do not understand how to enter a Uniform Resource Locator (URL) on a small mobile device such as a cellular telephone. Such an operation normally involves inputting a long character string, which is not an intuitive operation on cellular telephone or other mobile device that has a limited keypad.

What is needed, therefore, is a way to make such mobile devices more user-friendly, and hence, more useful to their users. In particular, what is needed is a way to make the Internet access capabilities of mobile devices, especially browsers, more discoverable by their users and to encourage use of such capabilities.

SUMMARY OF THE INVENTION

The present invention includes a method and apparatus in which a signal representing initiation of a voice call from a mobile device is received at a server system coupled to serve mobile devices operating on a wireless network, the voice call being directed to a destination having a destination telephone number. A determination is made in the server system whether content is associated with the destination telephone number. In response to determining in the server system that content is associated with the destination telephone number, a signal is sent to cause the mobile device to alert a user of the mobile device about the content.

Another aspect of the invention is a method and apparatus in which input including a set of numeric digits, including at least one digit is received. The set of digits represents input by a user into a mobile device, and may be in telephone number format. The mobile device is operable on a wireless network as both a telephone end user device and a web access device. A determination is made of whether the input includes a predetermined control indication associated with the set of digits. If the input includes a predetermined control indication associated with the set of digits, then access to the content is initiated. The content is to be provided to the mobile device via the wireless network and output to the user by the mobile device.

Other features of the present invention will be apparent from the accompanying drawings and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 4B shows an example of a process that may be performed by the WCPS in accordance with another embodiment of the invention;

DETAILED DESCRIPTION

A method and apparatus for enhancing discoverability and usability of Internet functionality in a mobile device on a wireless network, particularly its browser, are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

Browser Discoverability

Figure 1:
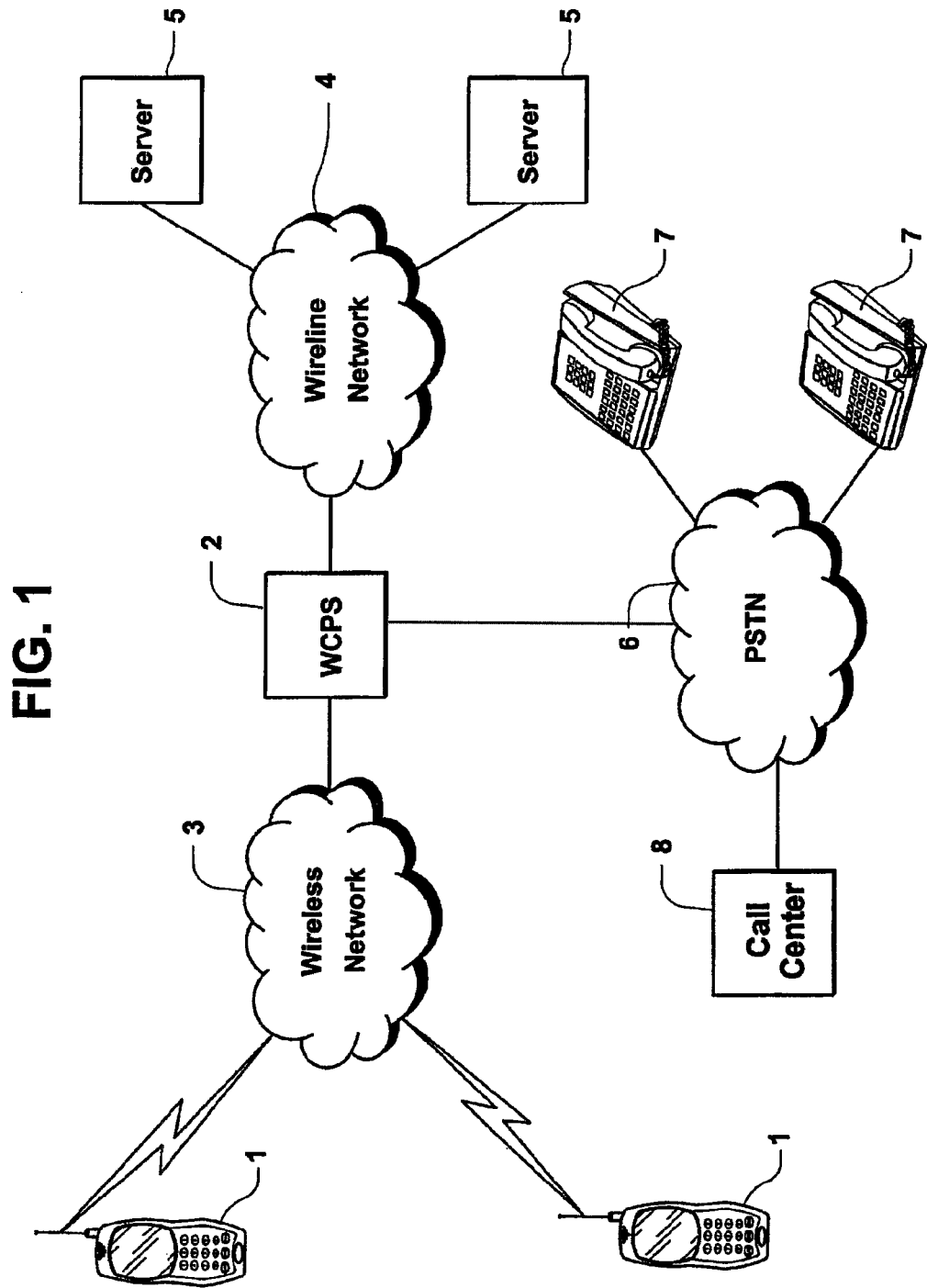
FIG. 1 shows an example of a network environment in which the invention can be implemented.

FIG. 1 shows an example of a network environment in which the invention can be implemented. As shown, one or more mobile devices 1 operate on a wireless network 3. The mobile devices 1 are voice-enabled (i.e., capable of use for telephone voice calls) and can include, for example, one or more cellular telephones, personal digital assistants (PDAs), two-way pagers, laptop computers, and/or other similar devices with wireless data communication capability. A wireless carrier processing system (WCPS) 2 is connected to the wireless network 3. The WCPS 2 is operated by the "wireless carrier", i.e., the operator of the wireless network 3. The mobile devices 1 are operated by users who subscribe to telecommunications and data services provided by the wireless carrier.

The WCPS 2 is also connected to the public switched telephone network (PSTN) 6 and to a wireline computer network ("wireline network") 4. For purposes of this description, the wireline network 4 is henceforth assumed to be the Internet, although in other embodiments the wireline network 4 could be a local area network (LAN), a private wide area network (WAN), or a corporate intranet. The WCPS 2 provides voice communication links in a conventional manner to enable telephone voice calls between mobile devices 1, or between mobile devices 1 and landline telephones 7 on the PSTN 6, or between mobile devices 1 and a call center 8 on the PSTN 6. The call center 8 may be, for example, the automated call answering system of a business entity.

A number of network servers 5 are connected to the wireline network 4. The mobile devices 1 may operate as clients when interacting with the network servers 5. The network servers 5 may be, for example, World Wide Web servers on the Internet or other types of content servers. Accordingly, the WCPS 2 also performs data centric services, including: controlling connection of the mobile client devices 1 to the network servers 5 (session management); retrieving content (e.g., web pages) from network servers 5 on behalf of the mobile devices 1 (proxying); caching content; providing content to mobile devices; and ensuring that content provided to the mobile devices 1 is in a form that the mobile device 1 can understand (translation). The WCPS 2 also performs transaction logging and billing management relating to telephone and data services.

The term "content", as used herein, can mean essentially any type of data for which a mobile device may provide processing or output capability, other than standard telephonic audio. One type of content, therefore, is a web page, which may be expressed in a language such as wireless markup language (WML), hypertext markup language (HTML), or extensible markup language (XML). Another possible type of content is a short messaging service (SMS) message. Yet another possible type of content is a multimedia messaging service (MMS) message and/or associated data. MMS is a 3G messaging standard which is based on the SMS standard, but which enables communication of non-real-time multimedia messages containing content such as pictures, music, images, graphics, and ring tones, over a wireless network. See, e.g., "WAP MMS, Architecture Overview," WAP-205, WAP Forum (Approved Version Apr. 25, 2001); "WAP MMS, Client Transactions," WAP-206, WAP Forum (Approved Version Jan. 15, 2002); "WAP MMS, Encapsulation," WAP-209, WAP Forum (Approved Version Jan. 5, 2002).

In accordance with the invention, certain telephone numbers may have content explicitly associated with them. With the technique introduced herein, a user who is unaware of the browser (or messaging application or other application) in his mobile device 1 can be easily introduced to it merely by initiating a telephone call to an entity (e.g., a person or business) that has a website or other source of content. To simplify description, it is henceforth assumed in this description that the "content" is a web page, although it is to be understood that the techniques described herein can also be applied to other types of content, such as those mentioned above.

According to certain embodiments of the invention, the WCPS 2 includes or has access to a database that stores associations between telephone numbers and web sites. When the WCPS 2 receives a signal representing initiation of a telephone call from a mobile device 1 via the wireless network 3, the WCPS 2 performs a lookup in the database to determine whether a website is associated with the telephone number being called (the "destination" telephone number). If a website is associated with the destination telephone number and the mobile device has the capability to access and display content of the website, the WCPS 2 sends an Alert (a notification message) to the mobile device 1 that initiated the call, via the wireless network 3. The Alert may be, for example, a wireless access protocol (WAP) Alert. The Alert causes a graphical user interface (GUI) in the mobile device 1 to output a notification about the website to the user of the mobile device 1. In this regard, the GUI may prompt the user to choose to either access the website associated with the dialed telephone number instead of completing the telephone call, or instead to proceed with the telephone call, by entering an appropriate input on the mobile device 1. Alternatively, the Alert may be sent to the mobile device as a telephonic voice message, which may be live, recorded or synthesized. If the user chooses to visit the website in response to the Alert, the browser in the mobile device 1 is automatically launched. Using this technique, therefore, a user who is unaware of the browser can be introduced to it merely as result of initiating a telephone call to an entity that has a website.

This technique may be better understood in connection with the following example. A user of a mobile device 1 may wish to make a telephone call to a particular business, Company XYZ. The user therefore enters the telephone number of Company XYZ into the mobile device 1 and initiates the telephone call. Upon receiving the telephone signal representing initiation of the telephone call, the WCPS 2 performs a lookup using the dialed telephone number and thereby determines that Company XYZ has a website. Accordingly, the WCPS 2 sends a WAP Alert to the mobile device 1, which causes the mobile device 1 to display the message "Enter website for Company XYZ?" on its display. Alternatively, the user of the mobile device may hear a voice message substantially similar to this. This may be done before the voice call is connected or while the call is connected. The user can then choose either to proceed with the voice call or instead to visit the website of Company XYZ, by providing an appropriate user input on the mobile device 1. If the user chooses to visit the website, the browser in the mobile device 1 is automatically launched. If the voice call has already been connected, it can be terminated at that time in view of the user's choice.

Figure 2:
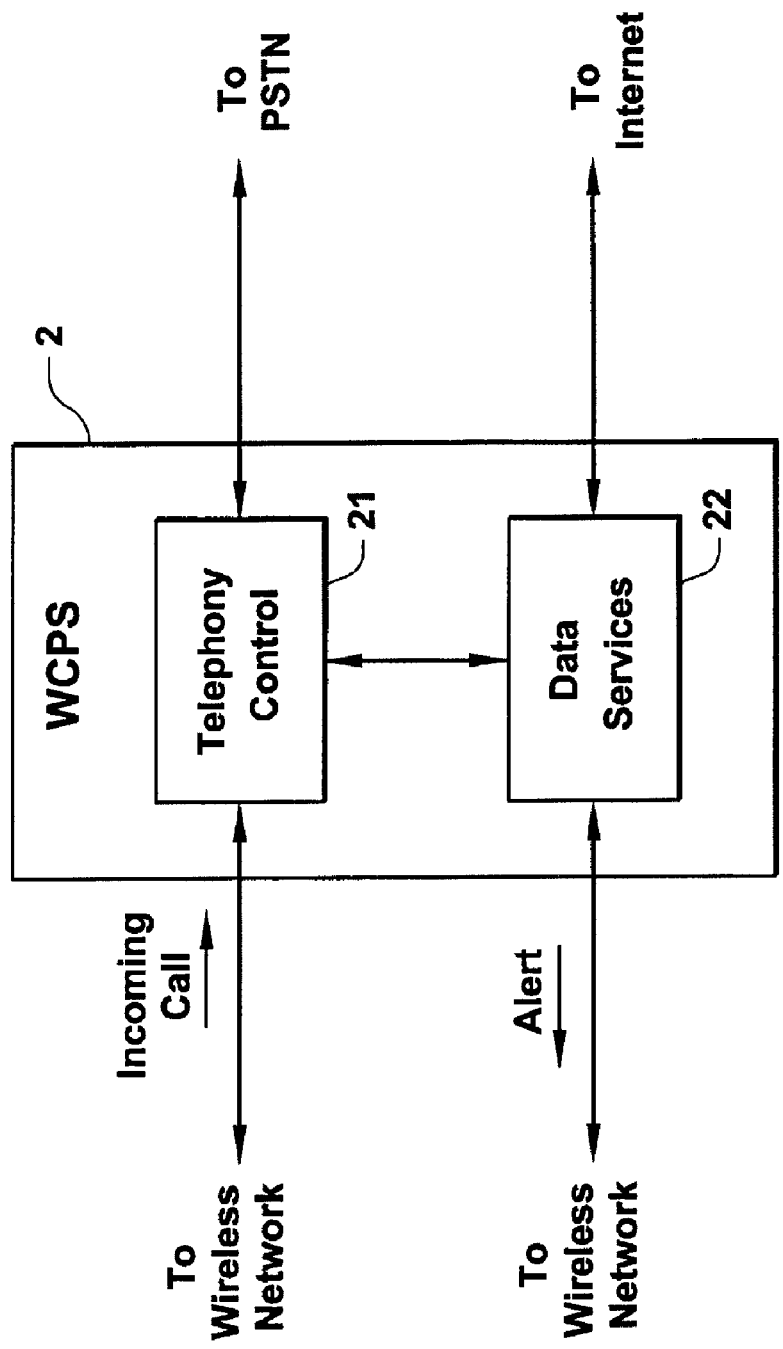
FIG. 2 shows components of a wireless carrier processing system (WCPS)

Refer now to FIG. 2, which shows the major components of the WCPS 2, according to certain embodiments. The WCPS 2 includes two major subsystems, i.e., a telephony control subsystem 21 and a data services subsystem 22. The telephony control subsystem 21 manages telephone (voice) calls that originate from, or are directed to, any of the mobile devices 1. In certain instances, described further below, the telephony subsystem 21 also invokes the data services subsystem 22. The data services subsystem 22 performs the data centric operations of the WCPS 2, as further described below.

Figure 3:
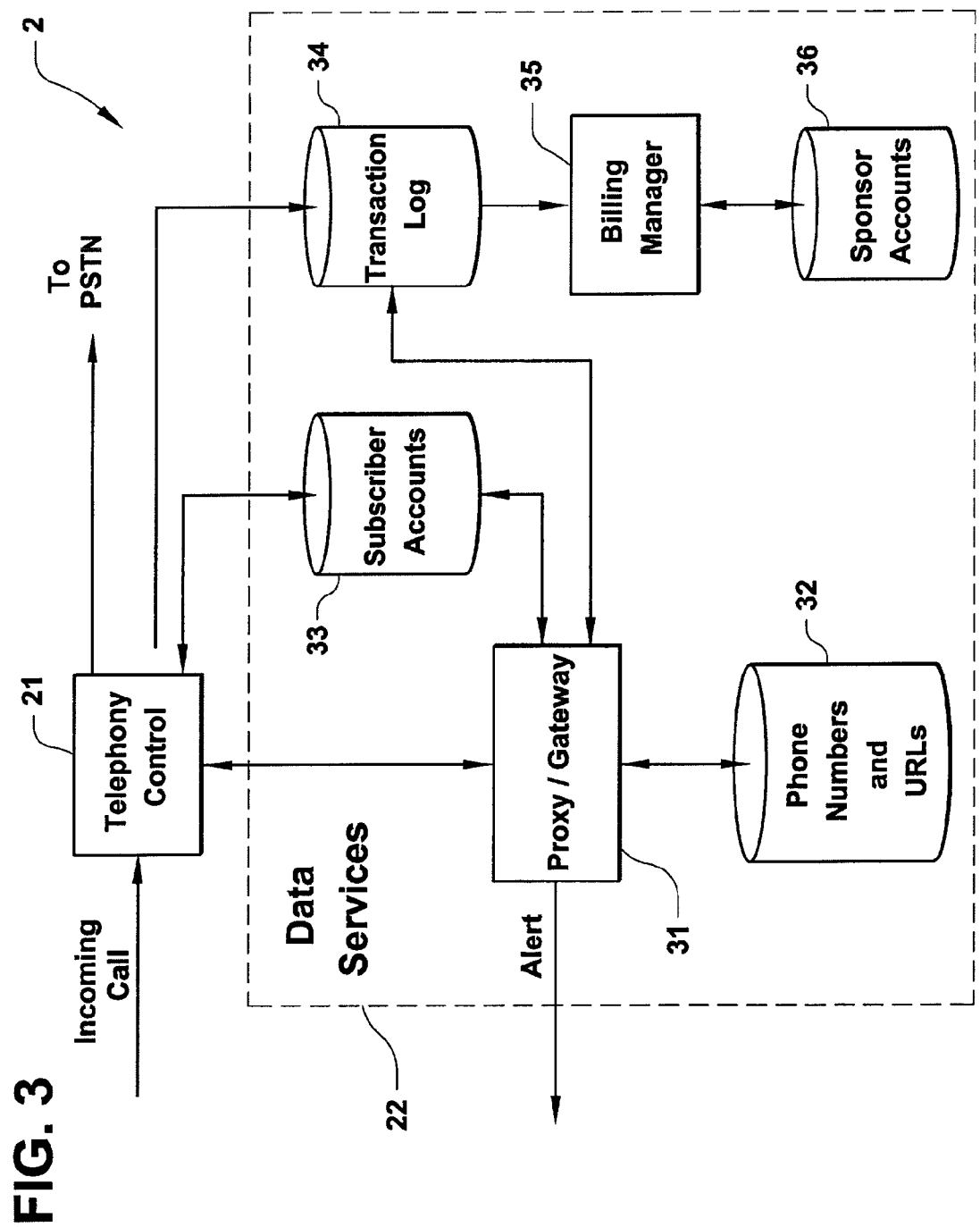
FIG. 3 shows an example of the WCPS in greater detail.

FIG. 3 shows the WCPS 2 in greater detail, according to certain embodiments of the invention. As shown, the data services subsystem 22 includes a proxy/gateway 31, a URLs database 32, a subscriber accounts database 33, a transaction logging database 34, a billing manager 35, and a sponsor accounts database 36. The proxy gateway 31 proxies requests and responses between mobile devices 1 and network servers 5. This functionality may include, for example, translating/converting between the language(s) and protocol(s) used on the wireline network (e.g., HTML and HTTP) and the language(s) and protocol(s) used on the wireless network (e.g., WML and WAP).

The URLs database 32 stores telephone numbers and URLs of web pages associated with the telephone numbers. The format of data storage and the manner of associating data in the URLs database may be in any convenient form. In certain embodiments the URLs database 32 may be in the form of a lookup table, in which each entry in the URLs database includes a telephone number and corresponding URL and/or domain name. In accordance with the invention, the proxy/gateway also sends Alerts (e.g., WAP alerts) to mobile devices 1 over the wireless network 3 when the mobile devices 1 initiate calls to telephone numbers that are identified as having web sites associated with them in the URLs database 32.

The subscriber accounts database 33 stores account data for each subscriber (each user of a mobile device 1), such as the subscriber's name, account number, mobile device identifier (ID) and telephone number, billing information, etc. To facilitate billing, the telephony control unit 21 and the proxy/gateway record in the transaction logging database 34 information about transactions performed by or on behalf of mobile devices 1. Transactions may include telephone calls as well as data-centric transactions, such as accessing web pages, sending instant messages, etc. The billing manager 35 uses the transaction information stored in the transaction logging database 34 to generate appropriate billing information, for use in charging subscribers and/or sponsors for transactions.

Normally, when a user of a mobile device 2 accesses the Internet, the user is charged for the call by the wireless carrier. The user typically is given a prompt such as "Internet call will be charged, OK?" before the call is completed, to allow the user to confirm or cancel the Internet access. According to certain embodiments of the invention, however, some operators of web sites may arrange an advance to pay for any sessions the WCPS 2 establishes to their Internet domains (e.g., their websites) on behalf of mobile users. For example, a business may set up a special toll-free (e.g., "1-800") telephone number representing its website, such that any access made to that website resulting from a call to that telephone number is automatically billed to the business rather than to the mobile user. Such web site operators are referred to herein as "sponsors".

The sponsor accounts database 36 stores information identifying sponsor billing arrangements. Consequently, when a mobile user accesses the website of a sponsor, the billing manager 35 uses information in the sponsor accounts database 36 to determine that the transaction is sponsored, such that the wireless carrier charges the sponsor for the transaction instead of charging the user of the mobile device 1. It will be recognized that the sponsor account database 36 can be omitted from embodiments in which the sponsored billing approach is not used.

Figure 4A:
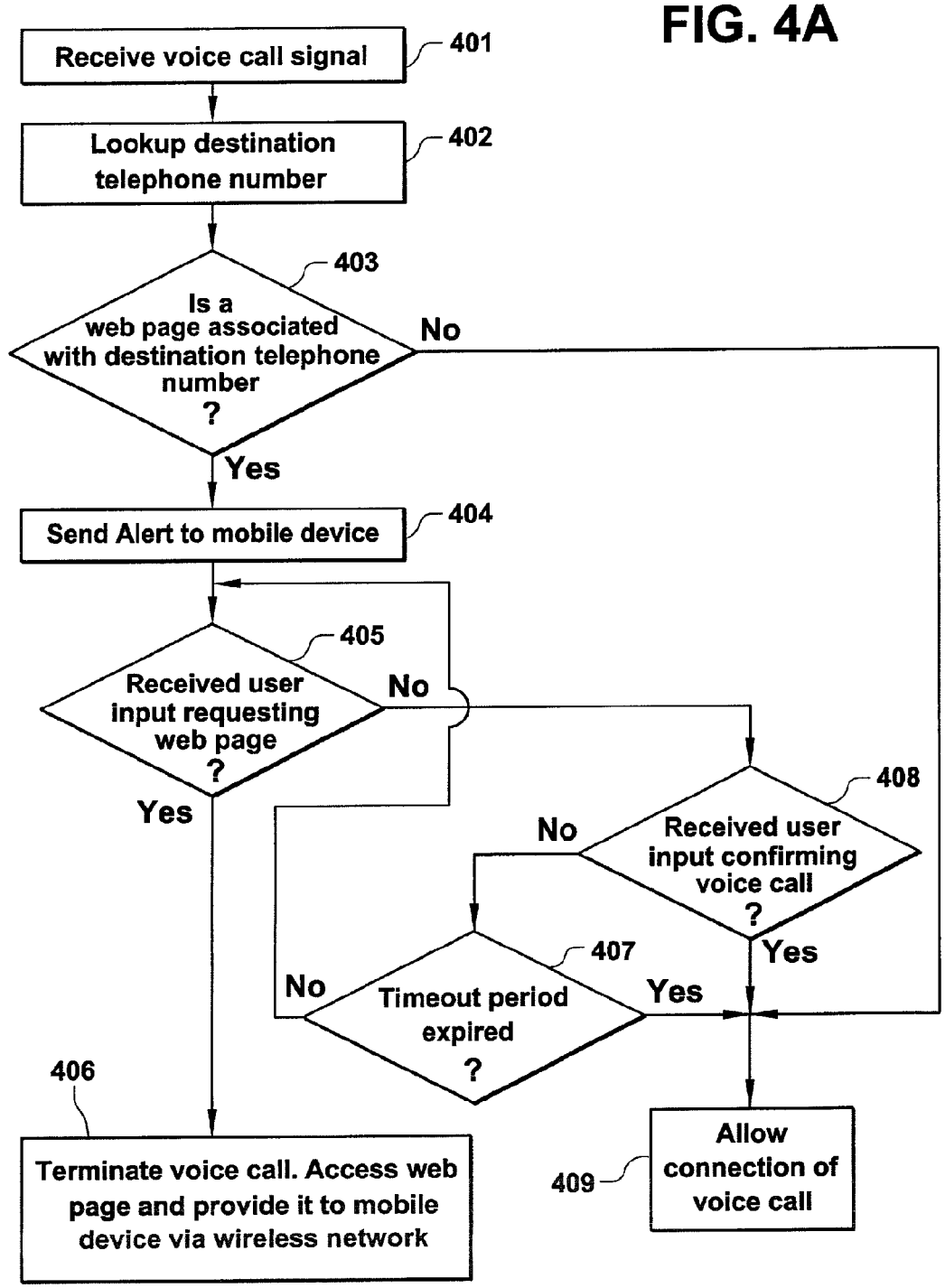
FIG. 4A shows an example of a process that may be performed by the WCPS in accordance with one embodiment of the invention.

FIG. 4A shows an example of a process that may be performed by the WCPS 2 in accordance with one embodiment the invention, which will now be described in conjunction with FIG. 3. Initially, at block 401 the telephony control subsystem 21 receives a voice (telephone) call signal indicating initiation of a voice call from one of the mobile devices 1. The signal includes data specifying the destination telephone number as well as the telephone number of the mobile device initiating the call. The destination telephone number could be (but is not necessarily) the telephone number of a sponsor, such that the calling party would not be charged in the event an Internet access is made as a result of the call.

At block 402, the telephony control subsystem 21 passes the destination telephone number to the data services subsystem 22, which looks up the destination telephone number in the URLs database 32. If no entry is found for the destination telephone number in the URLs database 32, then the process branches to block 409, in which the telephony control subsystem 21 immediately allows connection of the voice call. If an entry is found for the destination telephone number (i.e., there is a web page associated with the destination telephone number) (block 403), then at block 404 the data services subsystem 22 sends a WAP Alert to the mobile device 1 that initiated the call via the wireless network 3. The WAP Alert causes the mobile device 1 to display a message to the user, notifying the user that a web page is associated with the dialed telephone number. The WAP Alert may also cause the mobile device 1 to prompt the user to either choose to proceed with the voice call or to instead request the web page.

At block 405 the data services subsystem 22 determines whether it has received a request (representing a user input) for the web page from the mobile device 1. If such a request has been received, then at block 406 the data services subsystem 22 signals the telephony control subsystem 21 to terminate the voice call, accesses the web page, and provides the web page to the mobile device 1 that initiated the call via the wireless network 3. The web page may already be cached in the data services subsystem 22, or the data services subsystem may obtain the web page from its origin server 5. The web page may be transmitted to the mobile device 1 as, for example, a wireless markup language (WML) document over WAP.

If the request has not been received at block 405, the process branches to block 408, in which it is determined whether the WCPS 2 has received a signal representing a user input confirming that the voice call should proceed. If such a signal has been received, then the data services subsystem 22 signals the telephony control subsystem 21 to allow connection of the voice call. If no signal has been received, then at block 407 it is determined whether a predetermined timeout period has expired. If the timeout period has expired, the process proceeds to block 409, in which connection of the voice call is allowed. If the timeout period has not expired, the process loops back to block 405, described above.

FIG. 4B shows another example of a process that may be performed by the WCPS 2, where the call from the mobile device 1 is directed to a call center, such as call center 8 in FIG. 1. Initially, at block 411 the telephony control subsystem 21 receives a voice call signal indicating initiation of a telephone call from one of the mobile devices 1. The signal includes data specifying the destination telephone number as well as the telephone number of the mobile device initiating the call. At block 412, in contrast with the embodiment of FIG. 4A, the telephony control subsystem 21 immediately allows connection of the call to the destination, e.g., by forwarding the call signal to the appropriate destination or telephone network. At block 413, the telephony control subsystem 21 passes the destination telephone number to the data services subsystem 22, which looks up the destination telephone number in the URLs database 32. If no entry is found for the destination telephone number in the URLs database 32 (block 414), then this process ends.

If an entry is found for the destination telephone number (i.e., there is a web page associated with the destination telephone number) (block 414), and the call is currently connected to the destination (block 415) (the call might never have been answered at the destination, or it may already have been terminated by the participants), then the WCPS 2 waits at block 416 for a signal from the call center 8 indicating that the WCPS 2 should play a voice message to the user of the mobile device 1, to inform the user about the web page. This signal is used between the call center 8 and the WCPS 2 to avoid the message interfering with messages played by the call center 8.

In response to such a signal being received from the call center 8, at block 417 the WCPS 2 sends a voice message (e.g., recorded or synthesized) over the telephone connection to the mobile device 1, which is output audibly to the user of the mobile device 1 to inform the user of the mobile device 1 about the web page. If the call is not currently connected (block 415), then at block 420 the WCPS 2 sends a WAP Alert (or other form of non-voice alert) to the mobile device 1.

At block 418 or block 421, the data services subsystem 22 determines whether it has received a request (representing a user input) for the web page from the mobile device 1. If such a request is received while the call is in progress (block 418), then at block 419 the data services subsystem 22 signals the telephony control subsystem 21 to terminate the voice call, accesses the web page, and provides the web page to the mobile device 1 that initiated the call via the wireless network 3. If the request is received while the call is no longer in progress (block 421), then at block 422 the data services subsystem 22 accesses the web page and provides the web page to the mobile device 1 that initiated the call via the wireless network 3. Of course, many variations upon the above-described process can be made.

Figure 6:
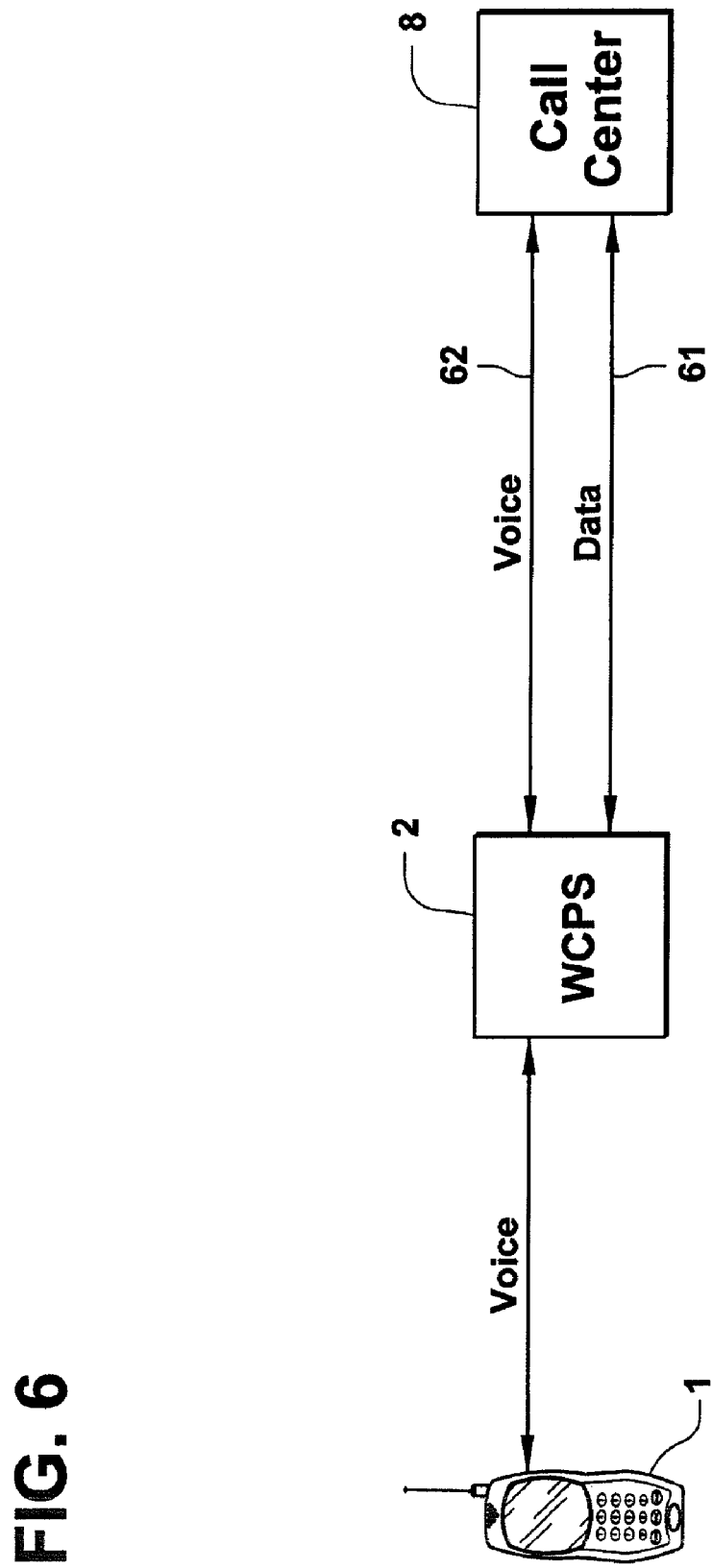
FIG. 6 shows a WCPS having a data connection and a voice connection with a call center.

Various control signals and/or data may be communicated between the call center 8 and the WCPS 2 for purposes of the above process and other processes, an example of which is indicated in block 416 described above. As another example, the operation of the WCPS 2 sending an Alert to the mobile device 1 may be done in response to a signal from the call center indicating that this action should be done. Thus, as shown in FIG. 6, the WCPS 2 may have a data connection 61 with the call center 8, in addition to a voice connection 62 for the voice call. The data connection 61 allows the call center 8 to signal the WCPS 2 for control purposes.

To better understand how this approach can be applied, consider the following example. Suppose a caller using a mobile device 1 calls an airline's call center from a mobile device. The call center connects and starts playing a voice menu, e.g., "press 1 for international reservations, press 2 for domestic reservations, press 3 to check flight schedules". The airline may prefer to speak with a caller for options 1 or 2. However if the caller selects option 3, then the airline may want to suggest switching the caller to data mode (e.g., web browsing), since the flight schedule information will likely not lead to increased revenue and the selected information is best received visually. In that case, the call center 8 signals the WCPS 2, via the data connection 61, to send an alert to the mobile device 1 (e.g., a voice message or WAP Alert) to notify the user about the web page.

As another example, when all operators at a call center are busy, it is common for the call center to offer the caller the option of using an automated voice system, which is an option that is disliked by many callers. Instead, another option can be offered to the user, i.e., the option of accessing a web page. By use of the data connection 61, the call center 8 can dynamically configure the WCPS 2 to enable or disable the data option (e.g., web browsing) according to any of various criteria, such as whether a web page is available, whether human operators are currently available in the call center, a menu option selected by the caller, etc.

In addition, note that in any particular system deployment, not all of the mobile devices 1 on the wireless network 3 will necessarily have the capability to receive and display the type of content that is associated with a particular telephone number, whether that content is a web page, MMS content, or some other type of content. Accordingly, the processes of FIGS. 4A and 4B can easily be modified to address this issue. For example, the system can determine whether the mobile device initiating the call has the capability to receive and output the type of content associated with the destination telephone number, before sending an Alert to the mobile device. To accomplish this, the WCPS 2 can look up the telephone number of the mobile device 1 that initiated the call (as indicated in the received telephone call signal) to access stored device capabilities information relating to that mobile device 1. This allows a determination of whether the mobile device 1 is capable of receiving and displaying content of the type which is associated with the destination telephone number. The device capabilities information may be stored in the subscriber accounts database 33, for example, or in a separate device capabilities database, or any other convenient location. The particular form of the device capabilities information is not germane to the present invention. If it is determined that the mobile device 1 is not capable of receiving and outputting that content type, then the voice call can be simply connected immediately without sending an Alert to mobile device 1. If the mobile device 1 is capable of receiving and outputting that content type, then the process can proceed as described above by sending an appropriate Alert to the mobile device 1.

URL Shortcuts m resource locators (URLs) into mobile devices, to access web pages. Since these devices commonly have only small keypads for alphanumeric input, input of text characters on these devices is often done by repetitively pressing numeric keys (e.g., the letter "L" is often obtained by pressing the "5" key three times in rapid succession on a telephone keypad). Furthermore, it is often difficult for users to determine which keys on a mobile device represent special characters that are commonly used in URLs, such as the "/" and "." characters. Many URLs are long and complex and, therefore, are extremely difficult and time-consuming to enter on typical mobile devices.

Therefore, in accordance with the invention, a telephone number or other set of numeric digits can be used to represent a URL for purposes of inputting the URL on a mobile device 1. More specifically, a URL is associated with a sequence of characters, and this association is stored in the mobile device 1, the WCPS 2, or some other processing system, in the form of a look up table, for example. The sequence of characters can be, but do not have to be, a sequence of numeric digits in telephone number format (e.g., a seven- or 10-digit sequence of numbers). To access the web page, the user simply enters the sequence of characters on the mobile device 1 as if it were a telephone number, with the addition of a special character or some other control indication. A sequence of digits in telephone number format is easier for a user to enter on a mobile device 1 having a limited keypad than is a standard URL comprising mostly text characters. A wireless carrier can provision a set of telephone numbers that represent URLs in the mobile device 1 when the device is initially configured for operation. Alternatively, essentially any number of numeric digits, even a single numeric digit, can be used to represent a URL when associated with a predetermined control indication. as described herein.

To access a web site from a mobile device 1 using this technique, a predetermined indicator is associated with the telephone number. For example, the user of the mobile device 1 may append a special character such as "@" as a prefix or suffix to the telephone number when entering the telephone number on the mobile device 1, to indicate the telephone number represents a URL. The mobile device 1 recognizes any telephone number to which such a character is appended as representing a URL and, in response, would look up the URL corresponding to the sequence of digits in its internal memory, or would forward the sequence of digits to a remote system such as the WCPS 2, with an indication that the sequence of digits represents a URL. As an alternative, just before or after entering the sequence of digits, the user of the mobile device 1 may press a predetermined key or actuate some other control on the mobile device to activate a "URL entry" mode in the mobile device 1, to indicate that the sequence of digits represents a URL.

Thus, an example of a process that can be implemented in a mobile device according to this technique is as follows. The mobile device 1 receives user input including a sequence of digits in telephone number format. The mobile device 1 then determines whether the user input includes a predetermined control indication, such as a predetermined special character appended to the sequence of digits or activation of a predetermined key. If the user input includes the predetermined control indication, then the mobile device 1 performs a look up to identify the URL associated with the sequence of characters, and sends a standard request (e.g., an HTTP GET) for the web page associated with the URL from the mobile device 1 to the WCPS 2 over the wireless network 3. If the user input does not include the predetermined control indication, then the mobile device 1 simply initiates a voice call in the conventional manner using the input sequence of characters as the destination telephone number.

Alternatively, as noted above, the "intelligence" for determining whether a sequence of characters represents a URL and for looking up the URL can reside in a central server, such as the WCPS 2, rather than in the mobile device. An example of a process according to such embodiments is as follows. The WCPS 2 receives from a mobile device 1, via the wireless network 3, a signal representing initiation of a telephone call. The signal includes a sequence of digits in telephone number format. The WCPS 2 then determines whether the signal includes a predetermined control indication, which may be of the types mentioned above. If the signal includes the predetermined control indication, then the WCPS 2 identifies the URL associated with the sequence of digits, accesses the web page associated with the URL (either from an internal cache or from a remote server), and provides the web page to the mobile device 1 over the wireless network 3. If the signal does not include the predetermined control indication, then the WCPS 2 simply allows connection of a voice call from the mobile device 1 to a destination indicated by the sequence of digits. Of course, many variations upon these processes can be implemented within the scope of the invention.

As will be apparent from the preceding discussion, the techniques introduced above can be implemented in software, which can be executed in processing systems that have conventional hardware. Hence, all of the processing systems described above (e.g., the mobile devices 1, the WCPS 2, and the servers 5) can be conventional in terms of their hardware. Alternatively, the techniques described above can be implemented in circuitry specially designed for such purposes, or in a combination of specially designed circuitry and software executed by conventional hardware.

Figure 5:
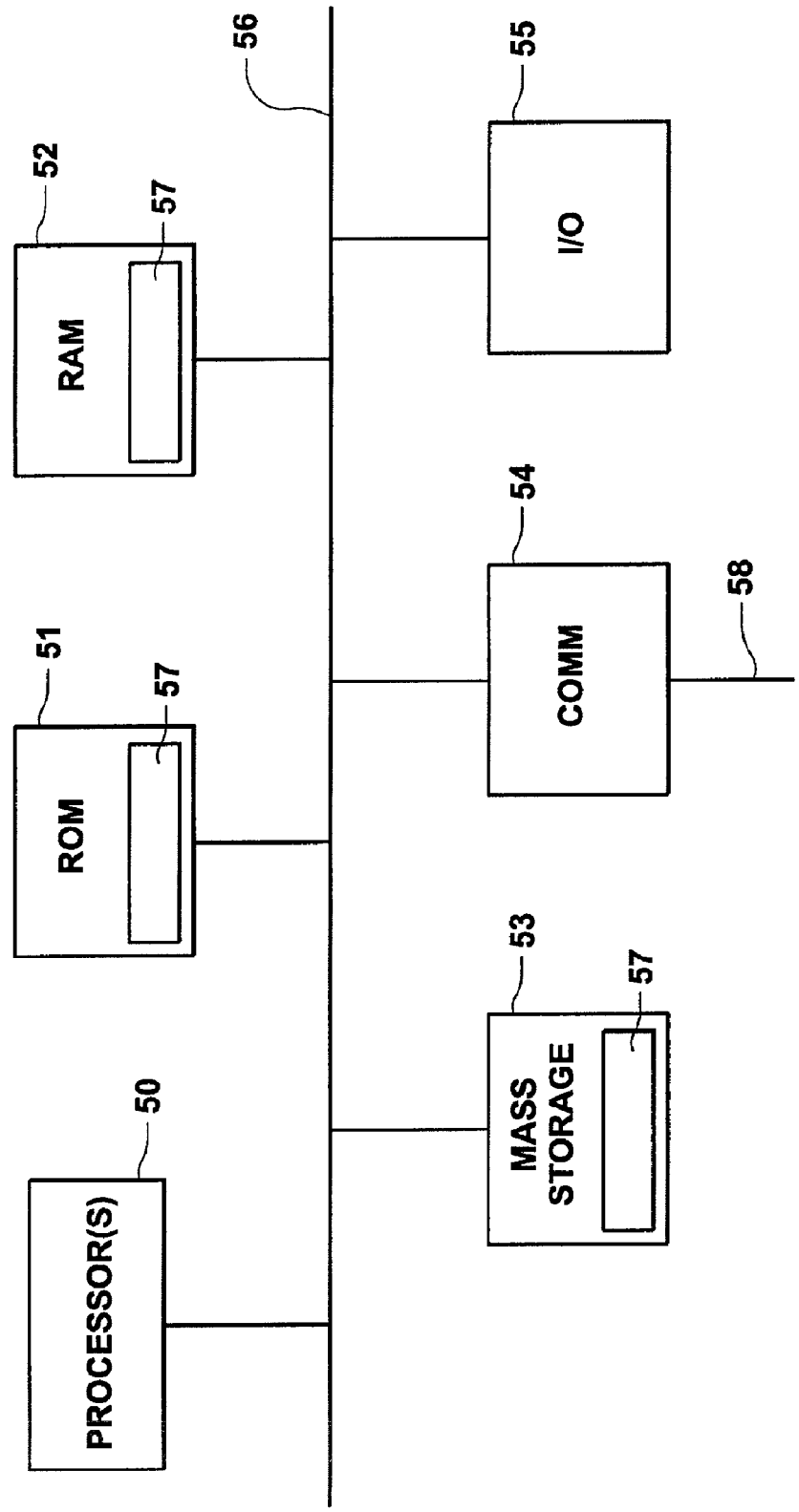
FIG. 5 is a high-level block diagram of a processing system representative of any of the processing systems mentioned herein.

FIG. 5 is a high-level block diagram of a processing system representative of any of the processing systems mentioned above, i.e., the mobile devices 1, the WCPS 2, and the network servers 5. Note that FIG. 5 is a conceptual representation which represents any of numerous possible specific physical arrangements of hardware components; however, the details of such arrangements are not germane to the present invention and are well within the knowledge of those skilled in the art. Also note that, in certain embodiments, some of the above-mentioned processing systems, such as the WCPS 2, may be distributed between two or more separate physical platforms (e.g., multiple servers).

The processing system shown in FIG. 5 includes one or more processors 50, i.e. a central processing unit (CPU), read-only memory (ROM) 51, and random access memory (RAM) 52, each connected to a bus system 56. Also coupled to the bus system 56 are a mass storage device 53, a data communication device 54, and in some embodiments, one or more additional input/output (I/O) devices 55.

The processor(s) 50 may be, or may include, one or more programmable general-purpose or special-purpose microprocessors or digital signal processors (DSPs), microcontrollers, application specific integrated circuits (ASICs), programmable logic devices (PLDs), or a combination of such devices. The bus system 56 includes one or more buses or other physical connections, which may be connected to each other through various bridges, controllers and/or adapters such as are well-known in the art. For example, the bus system 56 may include a "system bus", which may be connected through one or more adapters to one or more expansion buses, such as a Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire"). In alternative embodiments, some or all of the aforementioned components may be connected to each other directly, rather than through a bus system.

The mass storage device 53 may be, or may include, any one or more devices suitable for storing large volumes of data in a non-volatile manner, such as a magnetic disk or tape, magneto-optical (MO) storage device, or any of various types of Digital Versatile Disk (DVD) or Compact Disk (CD) based storage, or a combination of such devices.

The communication device 54 is a device suitable for enabling the processing system to communicate data with a remote processing system over a communication link 58, and may be, for example, a conventional telephone modem, a wireless modem, an Integrated Services Digital Network (ISDN) adapter, a Digital Subscriber Line (DSL) modem, a cable modem, a radio transceiver, a satellite transceiver, an Ethernet adapter, or the like.

The I/O devices 55 may include, for example, one or more devices such as: a pointing device such as a mouse, trackball, touchpad, or the like; a keyboard; audio speakers; and/or a display device such as a cathode ray tube (CRT), a liquid crystal display (LCD), or the like. However, such I/O devices may be omitted in a system that operates exclusively as a server and provides no direct user interface. Other variations upon the illustrated set of components can be implemented in a manner consistent with the invention.

Software (including instructions and data) 57 to implement the techniques described above may be stored in one or more of ROM 51, RAM 52, and mass storage device 53. In certain embodiments, the software 57 may be initially provided to the processing system by downloading it from a remote system through the communication device 54. The data may include, for example, a lookup table of telephone numbers and URLs of web pages associated with them. The data could also include a look up table of telephone numbers and URLs which they represent.

Thus, a method and apparatus for enhancing discoverability and increasing usage of a web browser in a mobile device on a wireless network have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method comprising:
at a server system having memory and one or more processors:
receiving a telephone call from a telephony device, the telephone call being for accessing a destination, wherein the telephony device is operable on a wireless network and has both voice capability and data capability;
establishing a voice connection between the server system and the telephony device;
returning a voice response to a user of the telephony device through the voice connection, wherein the voice response includes a plurality of voice options for the user of the telephony device to choose;
receiving a user selection of one of the plurality of voice options in association with the telephone call;
determining whether the user-selected voice option is a first one of the plurality of voice options or a second one of the plurality of voice options;
in response to a determination that the user-selected voice option is said first one of the plurality of voice options, returning a data response to the user of the telephony device through a data connection between the server system and the telephony device, the data response including a link to a network-based resource associated with said destination; and
in response to a determination that the user-selected voice option is said second one of the plurality of voice options, providing a voice call connection between the telephony device and a party associated with the destination.

2. The computer-implemented method of claim 1, wherein the data response causes the telephony device to display an alert that prompts the user of the telephony device to launch an application program on the mobile device.

3. The computer-implemented method of claim 2, wherein the alert is in one format selected from the group consisting of a short messaging service (SMS) message and a multimedia messaging service (MMS) message.

4. The computer-implemented method of claim 2, wherein the application program is one selected from a group consisting of a web browser application and a telephony application exclusively associated with the destination.

5. The computer-implemented method of claim 2, wherein the voice connection between the server system and the telephony device is terminated after the application program is launched on the telephony device.

6. The computer-implemented method of claim 2, wherein the voice connection between the server system and the telephony device is maintained after the application program is launched on the telephony device.

7. The computer-implemented method of claim 1, wherein the telephone call is initiated by a telephony control system that is communicatively coupled to the telephony device in response to a signal from the telephony device, the signal including a set of numeric digits identifying a destination telephone number, and the telephony control system is responsible for forwarding the voice response from the server system to the telephony device.

8. The computer-implemented method of claim 1, wherein the voice response from the server system is configured to be played to the user of the telephony device through the voice connection.

9. The computer-implemented method of claim 8, further comprising:
receiving a second signal from the telephony device through the voice connection, the second signal including the the first one of the plurality of voice options;
determining a digital content associated with the second signal;
preparing the data response based on the digital content; and
sending the data response to the telephony device through the data connection.

10. The computer-implemented method of claim 9, wherein the digital content includes a web page.

11. The computer-implemented method of claim 9, wherein the digital content is associated with a hyperlink and the data response includes the hyperlink.

12. A computer-implemented method comprising:
at a telephony device having memory, one or more processors, and a display:
receiving a telephone number from a user;
establishing a voice connection between the telephony device and a destination identified by the telephone number;
playing, to the user, a voice response provided by the destination through the voice connection, wherein the voice response includes a plurality of voice options for the user to choose;
in response to a user selection of a first one of the plurality of voice options:
sending the first one of the plurality of voice options to the destination through the voice connection;
receiving a data response from the destination through a data connection between the telephony device and the destination, wherein the data response is associated with the first one of the plurality of voice options and includes a link to a network-based resource associated with said destination;
displaying an alert associated with the data response on the display, wherein the alert prompts the user to launch an application program on the telephony device:
in response to a user selection of a second one of the plurality of voice options, wherein the second one of the plurality of voice options is different from the first one of the plurality of voice options:
sending the second one of the plurality of voice options to the destination through the voice connection; and establishing a voice call connection between the telephony device and a party associated with the destination.

13. The computer-implemented method of claim 12, further comprising:
in response to a user action on the alert:
launching the application program on the telephony device, wherein the application program is configured to provide the user access to the destination through the data connection; and
terminating the voice connection with the destination.

14. The computer-implemented method of claim 13, wherein the application program is configured to perform one or more operations associated with a commercial transaction between the user and the destination according to instructions provided the user.

15. The computer-implemented method of claim 13, wherein the application program is one selected from a group consisting of a web browser and a dedicated mobile application.

16. The computer-implemented method of claim 13, wherein a telephony control system is configured to establish the voice connection between the telephony device and the destination after the telephony control system receives a signal from the telephony device that includes the telephone number and the telephony control system forwards the voice response from the destination back to the telephony device.

17. The computer-implemented method of claim 12, further comprising:
in response to a user action on the alert:
launching the application program on the telephony device, wherein the application program is configured to provide the user access to the destination through the data connection with the destination while maintaining the voice connection with the destination.

18. The computer-implemented method of claim 12, wherein the alert is in one format selected from the group consisting of a short messaging service (SMS) message and a multimedia messaging service (MMS) message.

19. A computer-implemented method comprising:
at a server system having memory and one or more processors:
receiving a signal including a set of numeric digits identifying a destination telephone number from a telephony device, wherein the telephony device is operable on a wireless network and has both voice capability and data capability;
after receiving the signal, establishing a voice connection between the telephony device and a destination identified by the destination telephone number;
in response to a first user instruction from the telephony device through the voice connection:
receiving a data message from the destination, wherein the data message is provided by the destination;
forwarding the data message to the telephony device in a format consistent with the telephony device's data capability, wherein the data message includes a link to an application program running on the telephony devices; and
in response to a second user instruction from the telephony device through the voice connection:
providing a voice call connection between the telephony device and a party associated with the destination.

20. The computer-implemented method of claim 19, wherein the data message causes the telephony device to display an alert that prompts the user of the telephony device to launch the application program on the telephony device.

21. The computer-implemented method of claim 20, wherein the alert is in one format selected from the group consisting of a short messaging service (SMS) message and a multimedia messaging service (MMS) message.

22. The computer-implemented method of claim 20, wherein the application program is one selected from a group consisting of a web browser and a dedicated mobile application.

23. The computer-implemented method of claim 19, wherein the set of numeric digits is a sequence of numeric digits in a standard telephone number format.

24. The computer-implemented method of claim 19, wherein the server system includes a telephony control system for establishing the voice connection between the telephony device and the destination.

25. The computer-implemented method of claim 19, further comprising:
before receiving the data message from the destination:
forwarding a voice response to the user of the telephony device through the voice connection, wherein the voice response includes a plurality of voice options for the user of the telephony device to choose; and
forwarding a third signal from the telephony device to the destination through the voice connection, the third signal including a user-selected voice option, wherein the data message is a response prepared by the destination based on the user-selected voice option.

26. The computer-implemented method of claim 19, wherein the voice connection between the server system and the telephony device is terminated after the application program is launched on the telephony device.

27. The computer-implemented method of claim 19, wherein the voice connection between the server system and the telephony device is maintained after the application program is launched on the telephony device.

28. A server system comprising a memory and one or more processors, the server system being configured to:
receive a telephone call from a telephony device, the telephone call being for accessing a destination, wherein the telephony device is operable on a wireless network and has both voice capability and data capability;
establish a voice connection between the server system and the telephony device;
return a voice response to a user of the telephony device through the voice connection, wherein the voice response includes a plurality of voice options for the user of the telephony device to choose;
receive a user selection of a one of the plurality of voice options in association with the telephone call;
determine whether the user-selected voice option is a first one of the plurality of voice options or a second one of the plurality of voice options;
in response to a determination that the user-selected voice option is the first one of the plurality of voice options, return a data response to the user of the telephony device through a data connection between the server system and the telephony device, the data response including a link to a network-based resource associated with said destination; and
in response to a determination that the user-selected voice option is the second one of the plurality of voice options, provide a voice call connection between the second telephony device and a party associated with the destination.

29. The server system according to claim 28, comprising an automated call answering system.

30. The computer-implemented method of claim 1, wherein the server system comprises an automated call answering system.

31. The computer-implemented method of claim 19, wherein the server system comprises an automated call answering system.

32. A computer program product comprising a non-transitory computer-readable storage medium having computer readable instructions stored thereon, the computer readable instructions being executable by a server system to cause the server system to perform a method for processing a telephone call, the server system comprising a memory and one or more processors, the method comprising:

receiving a telephone call from a telephony device, the telephone call being for accessing a destination, wherein the telephony device is operable on a wireless network and has both voice capability and data capability;

establishing a voice connection between the server system and the telephony device;

returning a voice response to a user of the telephony device through the voice connection, wherein the voice response includes a plurality of voice options for the user of the telephony device to choose;

receiving a user selection of one of the plurality of voice options in association with the telephone call;

determining whether the user-selected voice option is a first one of the plurality of voice options or a second one of the plurality of voice options;

in response to a determination that the user-selected voice option is said first one of the plurality of voice options, returning a data response to the user of the telephony device through a data connection between the server system and the telephony device, the data response including a link to a network-based resource associated with said destination; and in response to a determination that the user-selected voice option is said second one of the plurality of voice options, providing a voice call connection between the telephony device and a party associated with the destination.

33. The computer program product of claim 32, wherein the server system comprises an automated call answering system.

\* \* \* \* \*

UNITED STATES PATENT AND TRADEMARK OFFICE
CERTIFICATE OF CORRECTION

| | | |
|---|---|---|
| PATENT NO. | : 8,321,572 B2 | Page 1 of 1 |
| APPLICATION NO. | : 13/236581 | |
| DATED | : November 27, 2012 | |
| INVENTOR(S) | : Vandermeijden et al. | |

It is certified that error appears in the above-identified patent and that said Letters Patent is hereby corrected as shown below:

In column 12, line 24, please delete "the the" and add -- the --;

In column 13, line 60, please delete "devices" and add -- device --.

Signed and Sealed this
Twenty-ninth Day of January, 2013

David J. Kappos
*Director of the United States Patent and Trademark Office*